(12) United States Patent
Jansen

(10) Patent No.: US 6,315,926 B1
(45) Date of Patent: Nov. 13, 2001

(54) RADIATION CURABLE CONDUCTIVE COATING DISPERSION, PROCESS FOR ITS PREPARATION AND COATINGS MADE OF IT

(75) Inventor: Johan F. G. A. Jansen, Geleen (NL)

(73) Assignee: DSM N.V., Herleen (NL)

( * ) Notice: Subject to any disclaimer, the term of this patent is extended or adjusted under 35 U.S.C. 154(b) by 0 days.

(21) Appl. No.: 09/353,607

(22) Filed: Jul. 14, 1999

Related U.S. Application Data

(63) Continuation of application No. PCT/NL98/00010, filed on Jan. 7, 1998.
(60) Provisional application No. 60/043,475, filed on Apr. 11, 1997.

(30) Foreign Application Priority Data

Jan. 15, 1997 (NL) .................................................. 1005007

(51) Int. Cl.$^7$ ....................................................... H01B 1/00
(52) U.S. Cl. ...................... 252/500; 252/501.1; 252/502; 252/512; 252/518.1
(58) Field of Search ................................ 252/500, 501.1, 252/502, 512, 518.1

(56) References Cited

U.S. PATENT DOCUMENTS

| 4,406,826 | * | 9/1983 | Morgan et al. | 252/512 |
| 5,716,551 | * | 2/1998 | Unruh et al. | 252/500 |
| 6,004,724 | * | 12/1999 | Yamato et al. | 430/281.1 |
| 6,031,044 | * | 2/2000 | Kokel et al. | 524/839 |

* cited by examiner

Primary Examiner—Yogendra Gupta
Assistant Examiner—Derrick Hamlin
(74) Attorney, Agent, or Firm—Pillsbury Winthrop LLP

(57) ABSTRACT

The invention relates to an electrically conductive composition comprising a radiation curable resin and a dispersion of electrically conductive particles and in a dispersing agent, wherein the dispersion of electrically conductive particles contains a binder and an electrically conductive polymer and is stabilized by a non-ionic stabilization agent.

The invention also relates to the application of this composition in a conductive coating, the coating made using the composition according to the invention and a substrate coated wholly or partly with such a coating.

14 Claims, No Drawings

RADIATION CURABLE CONDUCTIVE COATING DISPERSION, PROCESS FOR ITS PREPARATION AND COATINGS MADE OF IT

This is a Continuation of International Appln. No. PCT/NL98/00010 filed Jan. 7, 1998. This application claims the benefit of U.S. Provisional Application No. 60/043,475, filed Apr. 11, 1997.

The invention relates to an electrically conductive composition comprising a dispersion of electrically conductive particles and a radiation curable resin in a dispersing agent.

Such a composition is known from EP-A-591.951. EP-A-591.951 describes an electrically conductive composition consisting of a dispersion of polyaniline particles and a radiation curable resin in an organic solvent.

The drawback of the known composition is that an electrically conductive coating made of it shows increasing haze with improving electrical conductivity.

The aim of the invention is to provide a composition which does not exhibit said drawback.

This aim is achieved according to the invention in that the dispersion of electrically conductive particles contains a binder and an electrically conductive polymer and is stabilized by a non-ionic stabilization agent.

The radiation curable resin preferably contains the following components: a compound with a ethylenic unsaturation on an electron-attracting group (a), whether or not in combination with a compound comprising an ethylenic unsaturation on an electron-donating group (b), or an allyl-group-containing compound on an electron-donating group (c), or a mixture of compounds (b) and (c).

The ethylenic unsaturation on an electron-attracting group (a) is characterized by the following structure element.

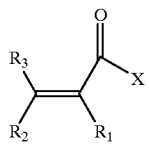

(I)

X can for instance be one of the following groups: $OR_4$, $NR_4R_5$, $SR_4$, $R_1$, $R_2$, $R_3$, can for instance be the following groups: H, $C_1$–$C_{20}$ alkyl, aryl, substituted aryl, $COOR_6$, $CONR_6R_7$, $CH_2COOR_6$, $CH_2OR_6$, $OR_6$, $NR_6R_7$, $SR_6$, Cl or CN. In these, $R_4$, $R_5$, $R_6$ and $R_7$ are chosen from the following groups:

H, $C_1$–$C_{20}$, alkyl (including linear and cyclic structures), aryl, substituted aryl, heterocycles containing O-, S-, N- or P-atoms, aromatic heterocycles containing O-, S-, N- or P-atoms, COY, $CH_2COY$, $CH_2OY$, $CH_2NYZ$, $CH_2SY$, $CH_2CH_2OY$, $CH_2CH_2NYZ$ $CH_2CH_2SY$, $CH_2CH(CH_3)OY$, $CH_2CH(CH_3)NYZ$, $CH_2CH(CH_3)SY$, $CH(CH_3)CH_2OY$, $CH(CH_3)CH_2NYZ$, $CH(CH_3)CH_2SY$, $(CH_2O)_nY$, $(CH_2NZ)_nY$, $(CH_2S)_nY$, $(CH_2CH_2O)_nY$, $(CH_2CH_2NZ)_nY$, $(CH_2CH_2S)_nY$, $(CH_2CH(CH_3)O)_nY$, $(CH_2CH(CH_3)NZ)_nY$, $(CH_2CH(CH_3)S)_nY$, $(CH_2CH(CH_3)S)_nY$, $(CH(CH_3)CH_2O)_nY$, $(CH(CH_3)CH_2NZ)_nY$, $(CH(CH_3)CH_2S)_nY$, n being a number between 1 and 100. Y and Z can be chosen from the following groups: H, $C_1$–$C_{20}$ alkyl (including linear and cyclic structures), aryl, substituted aryl, heterocycles containing O-, S-, N- or P-atoms, aromatic heterocycles containing O-, S-, N- or P-atoms. Derivatives of these compunds can also be used, such as for instance esters, urethanes, urea, thiourethanes and anhydrides.

Preferably the following compounds or combinations thereof are used: acrylates (X=$OR_4$, $R_1$=H, $R_2$=H, $R_3$=H), methacrylates (X=$OR_4$, $R_1$=$CH_3$, $R_2$=H, $R_3$=H), acrylamides (X=$NR_4R_5$, $R_1$=H, $R_2$=H, $R_3$=H), fumarates (X=$OR_4$, $R_1$=H, $R_2$=$COOR_6$, $R_3$=H), maleates (X=$OR_4$, $R_1$=H, $R_2$=H, $R_3$=$COOR_6$), itaconates (X=$OR_4$, $R_1$=$CH_2COOR_6$, $R_2$=H, $R_3$=H), citraconates (X=$OR_4$, $R_1$=$CH_3$, $R_2$=H, $R_3$=$COOR_6$), or mesaconates (X=$OR_4$, $R_1$=$CH_3$, $R_2$=$COOR_6$, $R_3$=H) and derivatives thereof, including for instance fumaramide-esters, maleamide-esters and fumaramides. Cyclic structures in which X is bonded to $R_1$, $R_2$ or $R_3$ can also be used. Examples of such cyclic structure are the maleimides which are characterized by the following structure element:

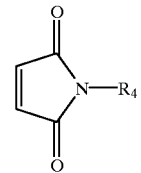

(II)

in which $R_4$ can be chosen from the following groups: H, $C_1$–$C_{20}$, alkyl (including linear and cyclic structures), aryl, substituted aryl, heterocycles containing O-, S-, N- or P-atoms, aromatic heterocycles containing O-, S-, N- or P-atoms, COY, $CH_2COY$, $CH_2OY$, $CH_2NYZ$, $CH_2SY$, $CH_2CH_2OY$, $CH_2CH_2NYZ$ $CH_2CH_2SY$, $CH_2CH(CH_3)OY$, $CH_2CH(CH_3)NYZ$, $CH_2CH(CH_3)SY$, $CH(CH_3)CH_2OY$, $CH(CH_3)CH_2NYZ$, $CH(CH_3)CH_2SY$, $(CH_2O)_nY$, $(CH_2NZ)_nY$, $(CH_2S)_nY$, $(CH_2CH_2O)_nY$, $(CH_2CH_2NZ)_nY$, $(CH_2CH_2S)_nY$, $(CH_2CH(CH_3)O)_nY$, $(CH_2CH(CH_3)NZ)_nY$, $(CH_2CH(CH_3)S)_nY$, $(CH(CH_3)CH_2O)_nY$, $(CH(CH_3)CH_2NZ)_nY$, $(CH(CH_3)CH_2S)_nY$, n being a number between 1 and 100. Y and Z can be chosen from the following groups: H, $C_1$–$C_{20}$ alkyl (including linear and cyclic structures), aryl, substituted aryl, heterocycles containing O-, S-, N- or P-atoms, aromatic heterocycles containing O-, S-, N- or P-atoms. Derivatives of these compunds can also be used, such as for instance esters, urethanes, urea, thiourethanes and anhydrides.

A compound with an ethylenic unsaturation on an electron-donating group (b) preferably is a vinyl ether, a vinyl ester, a vinyl amide, a vinylamine, a vinyl thioether or a vinyl thioester. Derivatives of these can also be used.

An allyl-group-containing compound on an electron-donating group (c) preferably is an allyl ether, an allyl ester, an allyl alcohol, an allyl amine or an allyl amide. Derivatives of these can also be used.

The amount of ethylenic unsaturation on an electron-attracting group (a) of the radiation curable resin is in general between 25% and 100%. The amount of ethylenic unsaturation on an electron-donating group (b) or an allyl-group-containing compound on an electron-donating group (c) or a mixture of these (b+c) of the radiation curable resin is between 0% and 75%, depending on the amount of ethylenic unsaturation on an electron-attracting group (a) of the radiation curable resin.

According to a preferred embodiment the radiation curable resin consists entirely of a compound with the ethylenic unsaturation on an electron-attracting group (a) or consists of a mixture of 50 mol % of a compound (a) and 50 mol % of a compound with an ethylenic unsaturation on an electron-donating group (b), or an allyl-group-containing compound (c) or a mixture of (b) and (c). The mol % mentioned here are relative to the radiation curable ethylenic unsaturation. The compound with the ethylenic unsaturation (a) preferably is an acrylate, a metacrylate, a maleate, a fumarate, an itaconate, a citraconate, or a mesaconate group.

The compound with the ethylenic unsaturation on an electron-attracting group (a) can be connected to polymers or oligomers via $R_4$. Examples of such polymers or oligomers are polyurethanes, polyesters, polyacrylates, polyethers, hydrocarbon polymers such as for instance polyolefines which for instance contain units from the group of ethene, propene, butadiene and styrene, (co)polymers of cyclopentadiene, polysilicates, polycarbonates, polyvinyl esters, rubbers such as polyisoprene, natural rubber and polyepoxides. Mixed polymers such as polyether urethanes, polyester urethanes, polyether carbonates and polyepoxide esters. Combinations of polymers or oligomers can also be used. In case the ethylenic unsaturation on the electron-attracting group (a) comprises, besides $R_4$, an additional functionality in the form of $R_1$, $R_2$ or $R_3$ such as for instance $COOR_6$, $CONR_6R_7$, $CH_2COOR_6$ or $CH_2OR_6$, the ethylenic unsaturation can be incorporated in the polymer or oligomer chain. Examples of such polymers or oligomers are unsaturated polyesters, with fumarate, maleate, itaconate, citraconate or mesaconate functionalities having been used in the synthesis of the polymer or oligomer.

Preferably, the number of ethylenic unsaturation on an electron-attracting group on a polymer or oligomer is higher than 1.

The ethylenic unsaturation on an electron-donating group (b) or the allyl-group-containing compound on an electron-donating group (c) can be connected to the above-described polymers or oligomers via ether, ester amine or amide compounds or, in the case of bifunctional ethylenic unsaturation on an electron-donating group or a bifunctional allyl compound, can also be incorporated in a polymer or oligomer chain.

Besides the above-described ethylenic unsaturations on or in a polymer or oligomer, the radiation curable resin can also contain low-molecular compounds with an ethylenic unsaturation. Examples of these are ethyl acrylate, methyl acrylate, propyl acrylate, ethyl methacrylate, methyl methacrylate, propyl methacrylate, hexane diol diacrylate, hexane diol dimethacrylate, trimethylolpropane triacrylate, trimethylolpropane trimethacrylate, pentaerythritol triacrylate, pentaerythritol trimethacrylate, pentaerythritol tetraacrylate, pentaerythritol tetramethacrylate, acrylamide N-methylacrylamide, N-ethyl acrylamides such as for instance acrylamide, N-laurylacrylamide, N-butylacrylamide, N-octylacrylamide, N,N-dimethylacrylamide, N,N-diethylacrylamide, maleate esters such as for instance ethyl maleate, diethyl maleate, methyl maleate, dimethyl maleate, hexyl maleate, dihexyl maleate, cyclohexyl maleate, dicyclohexyl maleate, octyl maleate, dioctyl maleate, maleamides such as N,N'-bismaleaamide, N,N'-dimethylmaleamide, N,N'-diethylmaleamide, N,N-diethylmaleamide, maleimides such as for instance maleimide, N-methyl maleimide, N-hexyl maleimide, N-cyclohexyl maleimide, fumarate esters such as for instance ethyl fumarate, diethyl fumarate, methyl fumarate, dimethyl fumarate, hexyl fumarate, dihexyl fumarate, cyclohexyl fumarate, dicyclohexyl fumarate, octyl fumarate, dioctyl fumarate, fumaramides, esters of itaconic acid such as for instance methyl itaconate, dimethyl itaconate, ethyl itaconate, diethyl itaconate, hexyl itaconate, dihexyl itaconate, cyclohexyl itaconate, dicyclohexyl itaconate, itacon amides, itacon imides, esters of citraconic acid such as for instance methyl citraconate, dimethyl citraconate, ethyl citraconate, diethyl citraconate, esters of mesaconic acid such as for instance methyl mesaconate, dimethyl mesaconate, ethyl mesaconate, diethyl mesaconate, vinyl ethers such as for instance butylvinyl, ether cyclohexyl, dimethanol divinyl ether, butyldivinyl ether, triethylene glycol divinyl ether and hydroxybutylvinyl ether, allyl compounds such as for instance allyl alcohol, allyl ether, diallyl ether, allylamine, diallylamine, triallyamine, trimethylolpropane allyl ether, trimethylolpropane diallyl ether, trimethylolpropane triallyl ether, pentaerythritol allyl ether, pentaerythritol diallyl ether, pentaerythritol triallyl ether, pentaerythritol tetraallyl ether, allyl acetate ester, diallyl adipate ester and diallyl phthalate ester.

Depending on the formulation and the radiation source used for curing of the resin, the radiation curable resin can contain a photoinitiator. Examples of suitable photoinitiators are described for instance in volume 3 van 'Chemistry and Technology of UV and EB Formulations' door K Dietliker (1992; SITA Technology Ltd. London).

The dispersion of electrically conductive particles contains a binder and an electrically conductive polymer and is stabilized by means of a non-ionic stabilizer. Such a dispersion is obtained for instance by polymerizing monomers to an electrically conductive polymer in the presence of a dispersion of a binder which has been stabilized with a non-ionic stabilizer. Under the given conditions a non-ionic stabilizer is not charged. The non-ionic stabilizer can be chosen within a wide range and can be absorbed physically on the binding agent particles (bound physically) as well as incorporated in the binding agent (bound chemically). The non-ionic stabilizer can be chosen for instance from the group comprising alkylamines, alkylamides, (ethoxylated) alkyl alcohols, alkyl pyrrolidoned, (ethoxylated) alkyl phenols, polyoxyalkyl esters, polyoxyalkyl ethers, glycolalkyl ethers, glycerolalkyl ethers, fatty acid esters and (ethoxylated) sorbitan alkylates, (hydroxy(m)ethyl) cellulose, polyvinyl alcohols, polyvinyl pyrrolidones, polyacrylamides. On account of their high effectiveness, the use of polyoxyalkyl ethers is preferred. Particularly suitable polyoxyalkyl ethers are for instance polyoxyethylene ethers, such as polyethylene glycol, alkoxypolyethylene glycol, such as for instance methoxypolyethylene glycol, and ethylene oxide/propylene oxide copolymers. In other cases polyoxyalkyl esters are preferred, on account of their low toxicity. An overview of non-ionic stabilizers is given by Helmut Stache and Kurt Kosswig in Tensid-Taschenbuch, Carl Hanser Verlag Wien, 1990.

If desirable, the dispersion of binding agent particles can also contain a minor amount of anionic stabilizers, cationic stabilizers and/or stabilizers which comprise both a non-ionic and an ionic part. The non-ionic part preferably comprises at least 10 carbon atoms. Widely used anionic stabilizers are for instance alkyl sulphates and alkyl sulphonates, ethoxylated alkyl sulphates, sulphonates and phosphates, ethoxylated alkylcarboxylic acids and alkylphenol carboxylic acids, ethoxylated alkylphenol sulphates and sulphonates, sulphosuccinates and carboxylates. Widely used cationic stabilizers are primary, secondary, tertiary and quaternary ammonium salts, alkylpyridinium salts and acetylated polyamines.

Suitable non-ionic stabilizers mostly have a weight average molecular weight between 100 and 1,000,000, preferably between 500 and 5,000. A polymeric non-ionic stabilizer which is suitable for the invention is mostly composed of monomeric units comprising 1–50 carbon atoms, preferably 1–20 carbon atoms. Optionally, the polymeric non-ionic stabilizer comprises several units having different numbers of carbon atoms. An example of such a stabilizer is an ethylene oxide/propylene oxide copolymer. The non-ionic stabilizer can have been added to the dispersion of binding agent particles in a customary manner.

It is preferred for the non-ionic stabilizer to be bound chemically to the binding agent used. This can be effected by incorporating the non-ionic stabilizer in the binding agent by adding the non-ionic stabilizer during the polymerization of the binding agent. It is also quite well possible to graft the non-ionic stabilizer onto already polymerized binding agent. The dispersion of binding agent particles usually contains between 1 and 35 wt %, preferably 5 to 25 wt. %, of non-ionic stabilizer relative to the total weight of binding agent and stabilizer.

The binding agent used in the dispersion according to the invention is preferably a known non-doping polymer with good coating properties. Such a polymer is chosen for instance from the group comprising alkyd resins, polyester resins, amino resins, phenolic resins, polyurethane resins, epoxy resins, acrylate resins, rubbers, such as for instance cyclic rubbers, polyisoprene, natural rubber, silicone resins, poly(vinyl chlorides), poly(vinyl esters), such as for instance poly(vinyl acetate), polyolefines which for instance contain units chosen from the group of ethene, propene, butadiene and styrene, and hydrocarbon resins, such as for instance (co)polymers of cyclopentadiene.

The alkyd resins which can be used as binding agent in the dispersion are composed for instance of polyols chosen from the group comprising glycerol, pentaerythritol, ethylene glycol, sorbitol, trimethylol ethane, trimethylol propane, dipentaerythritol, tripentaerythritol, neopentyl glycol and diethylene glycol, and polycarboxylic acids or derivatives thereof, for instance chosen from the group comprising phthalic anhydride, phthalic acid, isophthalic acid, maleic acid, maleic anhydride, fumaric acid, fumaric anhydride, and fatty acids such as linoleic acid and oleic acid. Possible methods of preparation of the alkyd resins are known to those skilled in the art and are described for instance by H. F. Mark et al. in the Encyclopedia of Chemical Technology, 1978, vol. 2, pp. 18–50.

Suitable polyester resins are for instance composed of dicarboxylic acid units or derivatives thereof, chosen from the group comprising maleic anhydride, fumaric acid, adipic acid, phthalic acid, isophthalic acid, terephthalic acid, tetrahydrophthalic acid and tetrachlorophthalic acid, and diol units, chosen for instance from the group comprising 1,2-propanol, 1,3-butanol, ethylene glycol, neopentyl glycol, diethylene glycol, bisphenol-A and tricyclo-decane dimethanol. Optionally, monofunctional and/or trifunctional monomer units can also be used. Possible methods of preparation of the polyester resins are known to those skilled in the art and are described for instance by the Oil and Colour Chemists' Association, Australia in "Surface coatings, vol. 1—Raw materials and their usage", Chapman and Hall Ltd, 1983, pp. 78–87.

Suitable epoxy resins are for instance derived from bisphenol A and epichlorohydrin. Epoxidated aliphatic and cycloaliphatic dienes, such as for instance 3,4-epoxycyclo-hexylmethyl-3,4-epoxycyclohexane carboxylate and 4-epoxyethyl-1,2-epoxycyclohexane, can also be used. Possible methods of preparation of epoxy resins are known to those skilled in the art and are described for instance in Ullman's Encyclopedia of Industrial Chemistry, 1985, vol. A9, pp. 547–563.

Suitable polyurethane resins are for instance reaction products of isocyanates and polyols. The isocyanates are chosen for instance from the group comprising 1,6-hexamethylenediisocyanate, polymethylene polyphenylisocyanate, 4,4'-methylene bis-(phenylisocyanate), 1,5-naphthalene diisocyanate, bitolylene diisocyanate, methylene bis (cyclohexylisocyanate), isophorone diisocyanate, trimethyl-hexamethylene diisocyanate, m-xylylene diisocyanate, 1,3-bis(isocyanatomethyl)cyclohexane and 1,4-bis (isocyanatomethyl)cyclohexane. The polyols are mostly chosen from the group comprising polyether polyols and polyester polyols. Possible methods of preparation of polyurethane resins are described for instance in Kirk Othmer's Encyclopedia of Chemical Technology, 1982, vol. 23, pp. 576–608.

A dispersion of a polyurethane resin can be stabilized for instance by applying polyoxyethylene segments on the polyurethane chain, as described for instance by J. W. Rosthauser et al. in Advances in Urethane Science and Technology, 1987, Stanford, vol. 10, pp. 121–162 and by D. Dieterich in Progress in Organic Coatings, 1981, vol. 9, pp. 291–332. The segments can be composed of modified diol or isocyanate units, but it is also possible to apply mono-hydroxyfunctional polyoxyethylene polyethers directly on the polyurethane chain.

Suitable amino resins are for instance reaction products of formaldehyde with compounds containing amino groups, such as for instance melamine, benzoguanamine, glycoluril and urea. Amino resins and the methods for preparing them are described for instance by the Oil and Colour Chemists' Association, Australia in "Surface coatings, vol. 1—Raw materials and their usage", Chapman and Hall Ltd, 1983, pp. 87–98.

Suitable phenolic resins are for instance reaction products of a phenol compound and an aldehyde compound, or derivatives thereof. The phenol compound is chosen for instance from the group comprising phenol, o-cresol, 2,4-xylenol, bisphenol-A, p-phenylphenol and p-tertiary butylphenol. The aldehyde compound is for instance formaldehyde. Phenolic resins and the methods for preparing them are described for instance by the Oil and Colour Chemists' Association, Australia in "Surface coatings, vol. 1—Raw materials and their usage", Chapman and Hall Ltd, 1983, pp. 99–104.

Suitable silicone resins are for instance hydrolysis products of di- and trifunctional chlorosilanes. To obtain these, the chlorosilanes are dissolved in an organic solvent, such as toluene or xylene, and then hydrolyzed with water. Silicone resins can also be prepared by treating alkoxysilanes, such as methoxy, ethoxy and/or propoxy silanes, with a strong acid in an aqueous medium, and then allowing polymerization to take place. Silicone resins and the methods for preparing them are described for instance by the Oil and Colour Chemists' Association, Australia in "Surface coatings, vol. 1—Raw materials and their usage", Chapman and Hall Ltd, 1983, pp. 134–143.

Suitable acrylate resins are obtained for instance by homopolymerization of (meth)acrylate monomers, such as for instance methyl methacrylate, ethyl methacrylate or ethyl acrylate, or copolymerization of these monomers with monomers that react with them, such as for instance acrylonitrile, methacrylamide, maleic anhydride, aliphatic chains with a terminal acrylate group, methacrylic acid, vinyl acetate or styrene. Acrylate resins and the methods for preparing them are described for instance by the Oil and Colour Chemists' Association, Australia in "Surface coatings, vol. 1—Raw materials and their usage", Chapman and Hall Ltd, 1983, pp. 144–157.

Optionally, a mixture of several of the above-mentioned binding agents is used in the dispersion. It is also possible to use hybrid systems. Preferably a polyurethane resin is used as binder in the composition according to the invention.

The binding agent in the dispersion is optionally provided with functional groups. By causing these functional groups to react, for instance during the curing of the composition according to the invention, the binding agent can for instance be crosslinked or bonded to a substrate. These functional groups contain for instance an OH, a $NH_2$, a NCO, an epoxy, a N-methylal, a phosphate, a sulphate and/or a carboxylate functionality or a compound with an ethylenic unsaturation.

The dispersion of binding agent particles mostly has a weight average particle size between 10 nm and 10 $\mu$m, preferably between 10 nm and 3 $\mu$m. The solids content of the dispersion of binding agent particles mostly is between 1 and 90 wt %.

The invention also relates to a process for the preparation of the composition according to the invention. The preparation of the dispersion of electrically conductive particles takes place as follows. The monomers of which the electrically conductive polymer is to be composed are polymerized to an electrically conductive polymer in a dispersion of binding agent particles in the dispersing agent, which contains a non-ionic stabilizer. Optionally, a polymerization catalyst is also added. The sequence of addition of the various components to the dispersion of binding agent particles is of no significance in the framework of the invention. In the presence of a polymerization catalyst the monomer units polymerize to form an electrically conductive polymer. In this process the monomers may for instance polymerize in the dispersing agent to form an oligomer or an electrically conductive polymer, after which the oligomer or electrically conductive polymer—dissolving relatively poorly in the dispersing agent—precipitates on the stabilized binding agent particles. This results in a dispersion of electrically conductive particles which contain an electrically conductive polymer, which is mainly adsorbed at the surface of the binding agent particles. The dispersion of electrically conductive particles may also contain free electrically conductive polymer.

The temperature at which the dispersion of electrically conductive particles is prepared is mostly between −50 and 200° C., preferably between −10 and 80° C. The preparation time mostly varies from a few seconds to a few days, depending on the reaction rate of the polymerization of monomer units to electrically conductive polymer.

The polymerization which optionally is added to the dispersion of binding agent particles is chosen by the person skilled in the art from the group of inorganic acids, such as for instance hydrochloric acid, sulphuric acid, chlorosulphonic acid and nitric acid, Lewis acids, such as for instance compounds which contain positive ions of iron, aluminium, tin, titanium, zirconium, chromium, manganese, cobalt, copper, molybdenum, tungsten, ruthenium, nickel, palladium and/or platinum, and a halogen, a sulphate, a nitrate, an aryl sulphonate and/or an acetyl acetonate. Other suitable catalysts are for instance ozone, diazonium salts, organic catalysts, such as for instance benzoquinone and anthaquinone. In certain polymerization reactions Ziegler-Natta catalysts and compounds such as $K_2Cr_2O_7$, $K_2S_2O_8$, $Na_2S_2O_8$, $NaBO_3$, $H_2O_2$, $NOBF_4$, $NO_2BF_4$, $NO_2PF_6$, $NOClO_4$, $NOAsF_6$, $NOPF_6$ and $(NH_4)_2S_2O_8$ are adequately effective. Adequately effective catalysts are for instance $FeCl_3$, $FeBr_3$, $FeCl_3.6H_2O$, $CuSO_4$, $Fe(NO_3)_3.9H_2O$, $CuCl_2.2H_2O$, $K_3Fe(CN)_6$, $Cu(NO_3)_2$, $Fe(BF_4)_3$, $Fe(ClO_4)_3.9H_2O$, $Fe_2(SO_4)_3.5H_2O$, $Fe_2(SiF_6)_3$, $Cu(ClO_4)_2$, $Cu(BF_4)_2$, $CuSiF_6$, $RuCl_3$, $MoCl_5$, $WCl_6$ and $(C_5H_5)_2Fe^+$ $FeCl_4^-$. Optionally, a mixture of several catalysts is used. Iron(III)chloride is to be preferred as catalyst in the case of preparation of polypyrrole. The quantity of catalyst added is mostly such that the catalyst:monomer molar ratio is between 1:10 and 10:1, preferably between 1:3 and 3:1.

The monomer units of which the electrically conductive polymer in the composition according to the invention is composed are preferably chosen from the group comprising pyrrole, thiophene, indole, carbazole, furan, benzene, aniline, acetylene and derivatives of these monomers. In view of the level and the stability of the conductive properties, an electrically conductive polymer composed of pyrrole, thiophene or aniline units or derivatives of these monomers is to be preferred.

Examples of derivatives of these monomers are N-methylpyrrole, N-ethylpyrrole, N-n-propylpyrrole, N-n-butylpyrrole, N-fenylpyrrole, N-tolylpyrrole, N-naphtylpyrrole, 3-methylpyrrole, 3,4-dimethylpyrrole, 3-ethylpyrrole, 3-n-propylpyrrole, 3-n-butylpyrrole, 3-phenylpyrrole, 3-tolylpyrrole, 3-naphtylpyrrole, 3-methoxypyrrole, 3,4-dimethoxypyrrole, 3-ethoxypyrrole, 3-n-propoxypyrrole, 3-phenoxypyrrole, 3-methyl-N-methylpyrrole, 3-methoxy-N-methylpyrrole, 3-chloropyrrole, 3-bromopyrrole, 3-methylthiopyrrole, 3-methylthio-n-methylpyrrole, 2,2'-bithiophene, 3-methyl-2,2'-bithiophene, 3,3'-dimethyl-2,2'-bithiophene, 3,4-dimethyl-2,2'-bithiophene, 3,4-dimethyl-3',4'-dimethyl-2,2'-bithiophene, 3-methoxy-2,2'-bithiophene, 3,3'-dimethoxy-2, 2'-bithiophene, 2,2',5,2"-terthiophene, 3-methyl-2,2',5',2"-terthiophene, 3,3'-dimethyl-2,2',5',2"-terthiophene, 2-cyclohexylaniline, aniline, 4-propanoylaniline, 2-(methylamino)aniline, 2-(dimethylamine)aniline, o-toluidine, 4-carboxyaniline, n-methylaniline, m-hexylaniline, 2-methyl-4-methoxy-carbonylaniline, n-propylaniline, n-hexylaniline, m-toluidine, o-ethylaniline, m-ethylaniline, o-ethoxyaniline, m-butylaniline, 5-chloro-2-ethoxy-aniline, m-octylaniline, 4-bromoaniline, 2-bromoaniline, 3-bromoaniline, 3-acetamidoaniline, 4-acetamidoaniline, 5-chloro-2-methoxy-aniline, 2-acetylaniline, 2,5-dimethylaniline, 2,3-dimethylaniline, N,N-dimethylaniline, 4-benzylaniline, 4-aminoaniline, 2-methylthiomethylaniline, 4-(2,4-dimethylphenyl)aniline, 2-ethylthioaniline, n-methyl-2,4-dimethylaniline, n-propyl-m-toluidine, n-methyl-o-cyanoaniline, 2,5-dibutylaniline, 2,5-dimethoxyaniline, o-cyanoaniline, tetrahydronaphthylamine, 3-(n-butane sulphonic acid) aniline, 2-thiomethylaniline, 2,5-dichloroaniline, 2,4-dimethoxyaniline, 3-propoxymethylaniline, 4-mercaptoaniline, 4-methylthioaniline, 3-phenoxyaniline, 4-phenoxyaniline, n-hexyl-m-toluidine, 4-phenylthioaniline, n-octyl-m-toluidine, tetrahydrobenzo [c]thiophene, 4-trimethylsilylaniline and 3,4-(alkyleen-vic-dioxy-)thiophene.

Optionally, the electrically conductive polymer is composed of a mixture of several of the above-mentioned monomer units.

In a special embodiment, the above-mentioned monomers are obtained by in situ deblocking of precursor monomers. A precursor monomer is a molecule which as such cannot polymerize. In a simple conversion step, however, such a molecule is modified into a polymerizable monomer unit. This conversion step may consist of removal of a blocking group which screens off one or more reactive sites. Another possibility is removal of an electron-attracting group which raises the oxidation potential of the molecule, thereby preventing polymerization. In another embodiment an intramolecular reaction takes place, such as for instance a Diels-Alder retroreaction, whereby a precursor monomer is converted to a polymerizable monomer unit. Use can be made of any precursor monomer which after activation becomes a polymerizable monomer unit from which an electrically conductive polymer can be formed.

Suitable precursor molecules are for instance molecules which have a structure according to formula (III):

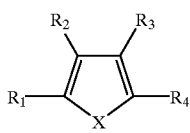

(III)

where X is

—S— of —O—;

$R_1$ is hydrogen —C(O)OH, —C(O)C(O)OH, —C(O)H, —SO$_3$H, —I or —Br is;

$R_2$ is hydrogen, an alkyl group (with 1–10 carbon atoms), —C(O)OH, or a halogen;

$R_3$ is hydrogen, an alkyl group (with 1–10 carbon atoms), —C(O)OH, or a halogen;

$R_4$ is hydrogen, —C(O)OH, —C(O)C(O)OH, —C(O)H, —SO3H, —I or —Br;

$R_5$ is hydrogen, or an alkyl, aryl, alkoxy or silyl group; on the understanding that $R_1$–$R_4$ cannot all be hydrogen at the same time and that $R_2$ and $R_3$ can both form part of a closed ring structure. Preferably use is made of pyrrole-2-carboxylic acid. The synthesis of this precursor monomer is described in J. Am. Pharm. Assoc. 45, 509 (1956).

All combinations of X, R1, $R_2$, $R_3$ and $R_4$ are possible. Groups $R_1$ and $R_4$ can be eliminated thermally or photochemically, involving the formation of a pyrrole, thiophene or furan monomer which may or may not be substituted on the $R_2$ and/or $R_3$ position(s). This precursor monomer is thus deblocked and can then polymerize freely via the $R_1$ and $R_4$ positions. Groups $R_2$ and $R_3$ can be the same or different. Further, groups $R_2$ and $R_3$ can both form part of a closed ring structure. A suitable example of such a precursor monomer is 3,4-(alkylene-vic-dioxy-)thiophene -2,5-dicarboxylic acid.

Other suitable precursor monomers with which an electrically conductive polymer can be prepared are precursor monomers having a structure according to formula (IV):

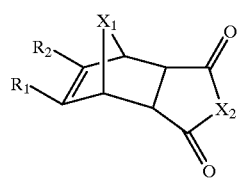

(IV)

where X1 and X2 are identical or different and are

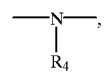

—S— or —O—;

$R_1$ and $R_2$ are identical or different and are hydrogen or an alkyl group with 1–10 carbon atoms;

$R_4$ is hydrogen or an alkyl, aryl or alkoxy group.

The precursor monomers according to formula (IV) can for instance be synthesized as described in J. Chem. Soc. Perkin Trans. I (1985), pp. 1277–1284. Another suitable precursor monomer is 4-aminobenzoic acid (see P. Ruelle, 7. Chem. Soc. Perkin trans. II, 1953 (1986). 3,4-disubstituted thiophenes can also be used (see for instance U.S. Pat. No. 4,987,042).

Combinations of all sorts of precursor monomers are possible. If desirable, precursor oligomers can also be used. The precursor monomers can be activated for instance by a thermal or photochemical treatment.

The weight ratio between the electrically conductive polymer and the binding agent can vary within wide limits, depending on the one hand on the desired electrical conductivity properties and the coating properties on the other. This ratio is mostly between 0.1:99.9 and 80:20, preferably between 0.1:99.9 and 20:80, more preferably between 0.1:99.9 and 10:90.

Depending on the electrically conductive polymer obtained, the electrical conductivity properties can be improved by means of a doping step (oxidative or reductive), using the known doping techniques and reagents. These are mentioned for instance in 'Handbook of conducting polymers' (T. A. Skotheim, Marcel Dekker Inc., New York, USA (1986)). Doping is effected for instance by adding a doping agent to the dispersion of electrically conductive particles.

The electrically conductive composition according to the invention is prepared by mixing the radiation curable resin with the dispersion of electrically conductive particles.

Optionally, up to 60 wt % of fillers and/or antioxidants can further be added to the electrically conductive composition. Examples of fillers that can be added are talcum, barium sulphate, calcium carbonate, fibres, (light-absorbing) pigments, such as for instance titanium white and coloured pigments such as iron oxide and SiO$_2$, kaolin, wollastonite and glass. Further, adhesion promoters, flow promoters, fillers, thickening agents, surface improvement agents, antifoaming agents, anticorrosive agents, curing agents, drying agents, conductive materials such as for instance carbon black, conductive fibres and conductive flakes, stabilizers and binding agents.

The dispersing agent chosen is such that both the first binding agent and the electrically conductive polymer do not dissolve or hardly dissolve in it. The catalyst and the monomer units of which the electrically conductive polymer is composed, do dissolve in the dispersing agent, however. The dispersing agent is often chosen from the group comprising water, aromatic compounds such as for instance benzene, toluene and xylene, alcohols such as for instance methanol and ethanol, hydrocarbons such as for instance pentane and hexane, ethers such as for instance dioxane, diethyl ether, ethylmethyl ether and tetrahydrofuran, ketones such as for instance acetone, diethyl ketone and methyl ethyl ketone, halogenated compounds such as for instance CHCl$_3$, CH$_2$Cl$_2$ and carbon tetrachloride, esters such as for instance ethyl formiate and ethyl acetate and compounds such as acetonitrile, nitromethane, dimethyl sulphoxide, dimethyl formamide, triethyl phosphate, dimethyl acetamide and pyridine. A mixture of several dispersing agents can also be used.

The dispersing agent is preferably capable of dissolving or dispersing the resin, as well as capable of dispersing the electrically conductive particles. From an environmental point of view, the use of water as dispersing agent is to be preferred.

The invention also relates to the application of the composition according to the invention in a conductive coating.

The invention further relates to a coating made wholly or partly using the composition according to the invention and to substrates coated wholly or partly with such a coating.

The invention will be further elucidated by means of the following examples and comparative experiments, without being limited thereto.

The surface resistivity of the coated products was determined by means of the method described by H. H. Wieder in Laboratory Notes on Electrical and Galvanomagnetic Measurements, Elsevier, N.Y., 1979.

The haze was determined in accordance with ASTM D 1003.

EXAMPLE I

A mixture of 2 g of a UV curable resin (Uraflex$^R$ XP 405UV from DSM Resins) and 13.6 g of a dispersion of electrically conductive particles (ConQuest$^R$XP 1000 from DSM) in 38.8 g of water was stored overnight.

The dispersion of electrically conductive particles had been prepared as follows: 12.32 g of $Fe(NO_3)_3.9H_2O$ was dissolved in 234.2 g of demineralized water (solution A). Then 0.89 g of pyrrole was dissolved in 43.6 g of water (solution B). Both solutions were added to 20 g of a dispersion of 40 wt % polyurethane in water (Uraflex XP 401 UZ from DSM Resins), stabilized by means of incorporated methoxy polyethylene glycol chains ($M_w$=750 g/mol). When the dispersion had been centrifuged for one hour at 14,000 rpm, the sediment was redispersed to a 20 wt % dispersion in water.

A 20 μm thick layer of the mixture stored overnight was applied to a glass plate. After the water had evaporated for 15 minutes at 50° C., the resin was cured with a radiation dose of 4 $J/cm^2$. The conductive film thus obtained had a surface resistivity $10^6$ Ohm/□ and a haze of 0.5%.

Comparative Experiment A

Solutions A and B from Example I are mixed and then centrifuged off, after which 0.68 g of sediment is dispersed in 52.4 g of water. To this, 2 g of Uraflex XP 405UV is added. The film made using this dispersion had a surface resistivity higher than $10^{12}$ Ohm/□ and a haze of 8%.

What is claimed is:

1. An electrically conductive composition comprising:
    a radiation curable resin having:
        a compound with an ethylenic unsaturation on an electron-attracting group (a), optionally in combination with
        a compound comprising an ethylenic unsaturation on an electron-donating group (b), or
        an allyl-group-containing compound on an electron-donating group (c), or
        a mixture of compounds (b) and (c); and
    a dispersion of electrically conductive particles in a dispersing agent, wherein the dispersion of electrically conductive particles contains a binder and an electrically conductive polymer and is stabilized by a non-ionic stabilization agent.

2. The composition according to claim 1, wherein the radiation curable resin
    consists entirely of a compound with the ethylenic unsaturation on an electron-attracting group (a), or
    consists of a mixture of 50 mol % of a compound (a) and 50 mol % of:
        a compound with an ethylenic unsaturation on an electron-donating group (b), or
        an allyl-group-containing compound (c), or
        a mixture of compound (b) and compound (c).

3. The composition according to any one of claims 1 or 2, wherein compound (a) contains an acrylate, a methacrylate, a maleate, a fumarate, an itaconate, a citraconate, or a mesconate group.

4. The composition according to claim 1, wherein compound (b) is a vinyl ether, a vinyl ester, a vinyl amide, a vinylamine, a vinyl thioether or a vinyl thioester.

5. The composition according to claim 1, wherein compound (c) is an allyl ether, an allyl ester, an allyl alcohol, an allyl amine or an allyl amide.

6. The composition according to claim 1, wherein the binder is a polyurethane resin.

7. A process for the preparation of an electrically conductive composition according to claim 1 comprising mixing a radiation curable resin with a dispersion of electrically conductive particles, wherein the dispersion of electrically conductive particles has been obtained by polymerizing monomers to an electrically conductive polymer in a dispersion of a binder in a dispersing agent containing a non-ionic stabilizer.

8. A process comprising applying the composition of claim 1 to a substrate as a conductive coating.

9. A coating wholly or partly made using the composition of claim 1.

10. A substrate wholly or partly coated with the coating according to claim 9.

11. The composition according to claim 1, wherein the radiation curable resin is an ultraviolet curable resin.

12. An electrically conductive composition comprising:
    a radiation curable resin having:
        a compound with an ethylenic unsaturation on an electron-attracting group (a), optionally in combination with
        a compound comprising an ethylenic unsaturation on an electron-donating group (b), or
        an allyl-group-containing compound on an electron-donating group (c), or
        a mixture of compounds (b) and (c); and
    a dispersion containing electrically conductive polymer.

13. An electrically conductive composition comprising:
    a radiation curable resin having:
        a compound with an ethylenic unsaturation on an electron-attracting group (a), optionally in combination with
        a compound comprising an ethylenic unsaturation on an electron-donating group (b), or
        an allyl-group-containing compound on an electron-donating group (c), or
        a mixture of compounds (b) and (c); and
    a dispersion of electrically conductive polymer particles in a dispersing agent,
    wherein the dispersion contains a binder and a non-ionic stabilization agent.

14. An electrically conductive composition according to claim 13, wherein the binder and the electrically conductive polymer do not dissolve in the dispersion.

* * * * *